Aug. 7, 1962
W. L. HUGHES
FIELD SEQUENTIAL COLOR SIGNAL COMBINED WITH CONTINUOUS BRIGHTNESS SIGNAL
Filed Jan. 13, 1959
3,048,653
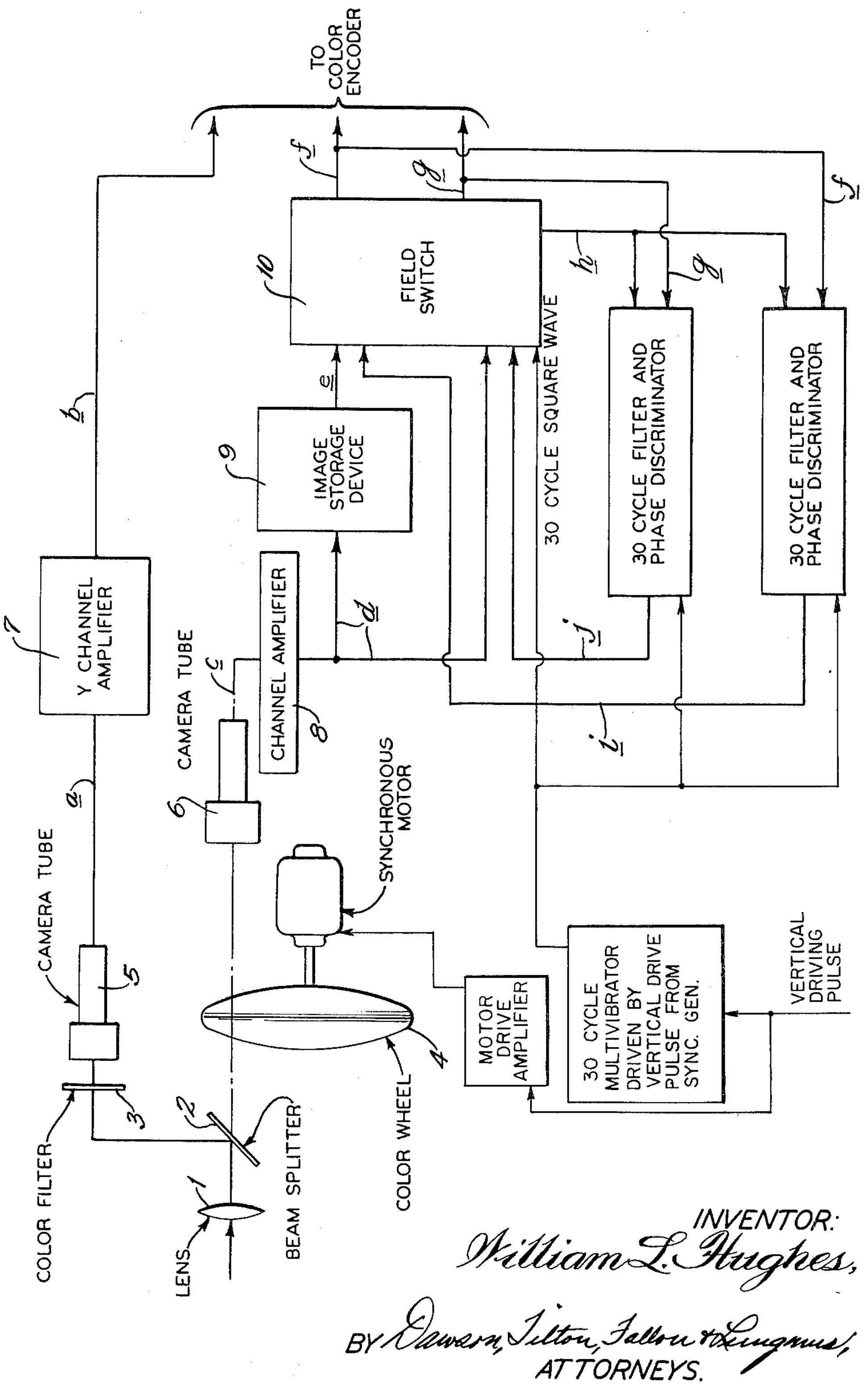
INVENTOR:
William L. Hughes,
BY Dawson, Tilton, Fallon & Lungmus,
ATTORNEYS.

United States Patent Office 3,048,653

Patented Aug. 7, 1962

3,048,653

FIELD SEQUENTIAL COLOR SIGNAL COMBINED WITH CONTINUOUS BRIGHTNESS SIGNAL

William L. Hughes, Ames, Iowa, assignor to Iowa State College Research Foundation, Inc., Ames, Iowa, a corporation of Iowa Filed Jan. 13, 1959, Ser. No. 786,514

5 Claims. (Cl. 178—5.4)

This invention relates to a color television system and, more particularly, to a method and means for simplifying the generation and transmission of color video information.

A principal object of this invention is to provide a method and means of color video signal generation that simplifies color pick-up devices. Another object is to reduce the number of camera tubes needed for color television from three to two. Still another object is to put the color information in an electrical form that greatly simplifies the problems of transmission.

The advantage of the proposed arrangement is not just a cost saving, although that, of course, is exceedingly important. The cost of the camera tubes alone may be significant enough to dissuade small stations from televising locally in color. What might be considered the principal consideration of the present arrangement of three camera tubes—one for each of the three pieces of color information derived—is that they must be matched in performance characteristics. That means that if one goes, almost without exception all three must be replaced. If, however, the number of tubes could be reduced to two, it is not too difficult to match a single remaining camera tube. This is achieved in the invention. Further, in the inventive device the matching requirements are much less stringent than in previously-employed devices.

Still another object is to utilize chroma switched fields to generate automatic color balanced signals for a color television system. Other objects and advantages of this invention can be seen as this specification proceeds.

This invention will be explained in conjunction with a schematic representation of color television equipment as found in the accompanying drawing.

In the illustration given, an object (not shown) is positioned in front of lens 1. The lens 1 and the beam splitter 2 serve to put an image on each of two camera tubes 5 and 6, the images first passing through color filter 3 and color wheel 4. The color filter 3 has a spectral characteristic (in conjunction with that of the beam splitter 2 and the spectral sensitivity of camera tube 5) such as to assign luminance information to the camera tube 5. The camera tube 5, plus the Y channel amplifier 7 and the electrical lines *a* and *b*, form the color television luminance channel and is characterized by having a wide band width.

Suitable for use as camera tubes 5 and 6 are RCA 5820 image orthicons or RCA 6198 vedicons. The beam splitter 2 is a commercially available device available from Bausch & Lomb, Eastman Kodak, Farrand Optical, etc., for making two optical images by splitting the light from a single lens.

The image on camera tube 6, as indicated above, passes through a color wheel which alternates the color information field by field. The color wheel has two optical filters (say red and blue, each occupying one-half the wheel) and the motor is synchronized with the vertical television field rate (i.e., 1800 r.p.m.) such that on even fields, one color is presented to the camera tube (say, red) and on odd fields, another color is presented (say, blue). Variations in the art are such that these colors could be other colorimetric information besides red and blue, but for the simplicity of information, reference hereafter shall be to the colors as red and blue. The Y information, designated luminance, is customarily taken as a signal made up of about 59% green, 29.6% red, and 11.4% blue. The output of camera tube 6 passes to its amplifier 8 and from there to an image storage device 9 and a field switch 10. Suitable for the device 9 is a Westinghouse WL–7225 Radechon barrier grid storage tube. A field switch suitable for this purpose has been described in my publication in the July 1956 issue of the SMPTE Journal. Both the camera tube 6 and amplifier 8 preferably are characterized by narrow band width.

The image storage device 9 operates as follows: On line *d* appear alternate fields of red-blue–red-blue, etc. Each of these fields is stored in the image storage device for one television field, and then read out on line *e* in the following field. Thus, while a sequence of red-blue–red-blue fields is being fed to the storage device, an opposite sequence of blue-red–blue-red fields are being read out on line *e*. At any one time, then, the field switch 10 has a red field on either *d* or *e* and a blue field on either *e* or *d*. The field switch operates at a field rate in a manner that makes red always come out on *f* and blue always come out on *g*.

The simultaneous input to the field switch on lines *d* and *e* would occur in the following order:

| Field | Line *d* | Line *e* |
|---|---|---|
| 1 | $R_1$ | ---------- |
| 2 | $B_2$ | $R_1$ |
| 3 | $R_3$ | $B_2$ |
| 4 | $B_4$ | $R_3$ |
| 5 | $R_5$ | $B_4$ |
| 6 | $B_6$ | $R_5$ |
| 7 | $R_7$ | $B_6$ |
| 8 | $B_8$ | $R_7$ |

From the foregoing, it is seen that colorimetric information pertaining to a particular color is taken from only every alternate field by the operation of the color wheel 4. Also, in the output field, one of the pieces of colorimetric information, R or B, is lagging the other two pieces of information by 1/60 of a second, if that is the synchronous speed of the color wheel. However, this lagging results only in a slight degradation of color detail and is invisible to the human eye.

An additional feature is feasible here. Lines *f* and *g* can be sampled, the 30-cycle switching signal (representing imbalance error) can then be filtered out and compared in a phase discriminator with the field switching signal on line *h*. The phase discriminators have a plus or minus D.-C. voltage output, depending upon the phase relationship of the voltages *f* and *g* with that on *h*. This D.-C. voltage is then used to control the gains in the field switch to rebalance the chrominance system. The filter and phase discriminator includes a conventional electrical band pass filter which emphasizes only thirty c.p.s. The phase discriminator also is conventional and is operative to compare the output of the thirty cycle filter with a reference thirty cycle signal. The discriminator produces a positive D.-C. voltage if the reference leads the filter output, and a negative D.-C. voltage if the reference signal lags the filter output.

The image storage device may take a number of forms. Special types of delay lines, mechanical magnetic devices, electronic image storage devices, etc., can be employed. A preferred form is currently available in the form of a barrier grid storage tube, such as the Westinghouse WL–7225 Radechon barrier grid storage tube mentioned above.

While, in the foregoing specification, a description of an embodiment of the invention has been set forth for the purpose of explanation thereof, those skilled in the art will perceive many variations in the details thereof without departing from the spirit and scope of the invention.

I claim:

1. In apparatus for generating and transmitting color television signals, means including two filter-equipped camera tubes for generating at the same field rate two field sequences of signals, one sequence consisting of the Y luminance characteristic of an object being swept by said tubes and the other sequence consisting of an alternating arrangement of two chrominance characteristics of said object, means for receiving said other sequence including a storage device for retarding signals received thereby for a time equal to that necessary to develop one field, means including a switch for receiving said other sequence simultaneously with the reception thereof by said storage-including means, and for receiving retarded signals from said storage device with said switch-including means switching signals at said field rate to develop two field sequences of chrominance signals, all of the signals in one of the last-mentioned sequences being of one of said chrominance characteristics while the signals in the other of said last-mentioned sequences all being of the other of said chrominance characteristics, each of said last-mentioned sequences comprising a series of duplicate fields.

2. In apparatus for generating and transmitting color television signals, means including two filter-equipped camera tubes for generating at the same field rate two field sequences of signals, one sequence consisting of the Y luminance characteristic of an object being swept by said tubes and the other sequence consisting of an alternating arrangement of two chrominance characteristics of said object, means for receiving said other sequence including a storage device for retarding signals received thereby for a time equal to that necessary to develop one field, means including a switch for receiving said other sequence simultaneously with the reception thereof by said storage-including means, and for receiving the retarded signals from said storage device with said switch-including means switching signals at said field rate to develop two field sequences of chrominance signals, all of the signals in one of the last-mentioned sequences being of one chrominance characteristic while the signals in the other of said last-mentioned sequences all being of the other of said chrominance characteristics, each of said last-mentioned sequences comprising a series of duplicate fields, said switch-including means including means for synchronizing the field rate of said switch with the field rate of the camera tube generating the chrominance characteristics sequence.

3. A color television generation and transmission system, comprising means including a first camera tube for generating a field sequence of signals of the Y luminance characteristics of an object being swept by said tube, means including a second camera tube for generating a field sequence consisting of signals of two chrominance characteristics of said object, with the chrominance characteristics alternating from field to field, said second camera tube means operating at the same field rate as said first camera tube means, means including a delay device coupled to said second camera tube means for delaying the alternating chrominance characteristics sequence a time equal to that needed to generate one field, and means including a double output switch coupled to said delay device-including means and said second camera tube-including means for switching signals received thereby at said field rate and for presenting at one output only signals of one of said chrominance characteristics and at the other output only signals of the other of said chrominance characteristics, at any given time, the signals at the two outputs being derived from different fields.

4. A color television generation and transmission system, comprising means including a first camera tube for generating a field sequence of signals of the Y luminance characteristics of an object being swept by said tube, means including a second camera tube for generating a field sequence consisting of signals of two chrominance characteristics of said object, with the chrominance characteristics alternating from field to field, said second camera tube means operating at the same field rate as said first camera tube means, means including a delay device coupled to said second camera tube means for delaying the alternating chrominance characteristics sequence a time equal to that needed to generate one field, and means including a double output switch coupled to said delay device-including means and said second camera tube-including means for switching signals received thereby at said field rate and for presenting at one output only signals of one of said chrominance characteristics and at the other output only signals of the other of said chrominance characteristics, at any given time the signals at the two outputs being derived from different fields, said switch-including means also including means for synchronizing the field rate of said switch with the field rate of said second camera tube.

5. A color television generating and transmission apparatus, comprising means including color wheel means, beam splitter means, lens means and only two camera tubes, for generating two field sequences of signals of an object being scanned, said tubes being operative to scan said object at the same field rate, one of said sequences consisting of a series of Y luminance characteristics signals while the other sequence consists of two chrominance characteristics signals alternating from field to field, means coupled to the tube generating the chrominance characteristics sequence including an amplifier, a transmission line, and a delay device for retarding each chrominance characteristic sequence signal for a time equal to that needed to generate one field, and means coupled to said delay device and transmission line including a switch synchronized with said color wheel means for grouping the chrominance signals from said transmission line and delay device in two sequences, each sequence consisting of signals of only one chrominance characteristic arranged with each signal duplicated and wherein at any given time the signal in one of the last-mentioned sequences emanates from a field different from that providing the signal in the other of said last-mentioned sequences, whereby only a single channel is employed in conjunction with the output of the chrominance characteristic sequence generating tube.

References Cited in the file of this patent

UNITED STATES PATENTS

| | | |
|---|---|---|
| 2,866,847 | James | Dec. 30, 1958 |
| 2,880,267 | Goldmark et al. | Mar. 31, 1959 |

FOREIGN PATENTS

| | | |
|---|---|---|
| 1,137,531 | France | May 29, 1957 |
| 776,878 | Great Britain | June 12, 1957 |